United States Patent
Hrusecky (10) Patent No.: US 6,529,244 B1
(45) Date of Patent: Mar. 4, 2003

(54) DIGITAL VIDEO DECODE SYSTEM WITH OSD PROCESSOR FOR CONVERTING GRAPHICS DATA IN 4:4:4 FORMAT TO 4:2:2 FORMAT BY MATHEMATICALLY COMBINING CHROMINANCE VALUES

(75) Inventor: David A. Hrusecky, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/470,277

(22) Filed: Dec. 22, 1999

(51) Int. Cl.[7] .......................... H04N 7/01; H04N 11/20; H04N 5/50

(52) U.S. Cl. ..................... 348/453; 348/441; 348/569; 348/450

(58) Field of Search .............................. 348/441, 450, 348/453, 444, 455, 563, 564, 565, 569; 345/600, 603, 604, 605

(56) References Cited

U.S. PATENT DOCUMENTS

| | | | | |
|---|---|---|---|---|
| 5,412,428 A | * | 5/1995 | Tahara | 348/396 |
| 5,489,947 A | | 2/1996 | Cooper | 348/589 |
| 5,534,942 A | * | 7/1996 | Beyers, Jr. et al. | 348/569 |
| 5,650,824 A | | 7/1997 | Huang | 348/453 |
| 5,673,378 A | | 9/1997 | Chaney et al. | 395/131 |
| 5,737,032 A | | 4/1998 | Stenzel et al. | 348/649 |
| 5,774,190 A | | 6/1998 | Marumoto et al. | 348/563 |
| 5,835,152 A | | 11/1998 | Hori | 348/455 |
| 5,969,770 A | * | 10/1999 | Horton | 348/569 |
| 5,990,969 A | * | 11/1999 | Bril | 348/553 |
| 6,088,062 A | * | 7/2000 | Kanou et al. | 348/441 |
| 6,144,412 A | * | 11/2000 | Hirano et al. | 348/441 |
| 6,175,389 B1 | * | 1/2001 | Felts, III et al. | 348/663 |
| 6,307,592 B1 | * | 10/2001 | Go | 348/453 |
| 6,369,855 B1 | * | 4/2002 | Chauvel et al. | 348/423.1 |

FOREIGN PATENT DOCUMENTS

EP   0 772 179 A2   5/1997   ............ G09G/1/16

* cited by examiner

Primary Examiner—John Miller
Assistant Examiner—Paulos Natnael
(74) Attorney, Agent, or Firm—William H. Steinberg, Esq.; Kevin P. Radigan, Esq.; Heslin Rothenberg Farley & Mesiti P.C.

(57) ABSTRACT

An on-screen display processor for a digital video signal processing system is disclosed. The OSD processor includes logic for converting a graphics bitmap in 4:4:4 format to graphics image words in 4:2:2 format for blending with video image words in a blend multiplexer of the digital video decode system. The OSD processor provides the graphics image words with blended chrominance values each obtained by merging chrominance values of at least two adjacent picture elements of the graphics bitmap. The merging includes mathematically combining U chrominance values of the at least two adjacent picture elements to produce a blended U chrominance and mathematically combining the V chrominance values of the at least two picture elements to obtain a blended V chrominance. In one embodiment, the mathematically combining comprises averaging the U chrominance values to obtain the blended U chrominance and averaging the V chrominance values to obtain the blended V chrominance.

9 Claims, 6 Drawing Sheets

```
X X X X X X X X X X X X X ← LINE 1
O   O   O   O   O   O   O
X X X X X X X X X X X X X ← LINE 2

X X X X X X X X X X X X X ← LINE 3
O   O   O   O   O   O   O

X X X X X X X X X X X X X ← LINE 4
       X REPRESENTS LUMINANCE SAMPLES
       O REPRESENTS CHROMINANCE SAMPLES
``` fig. 5

```
⊗ X ⊗ X ⊗ X ⊗ X ⊗ X ⊗ X ⊗ ← LINE 1
⊗ X ⊗ X ⊗ X ⊗ X ⊗ X ⊗ X ⊗ ← LINE 2
⊗ X ⊗ X ⊗ X ⊗ X ⊗ X ⊗ X ⊗ ← LINE 3
⊗ X ⊗ X ⊗ X ⊗ X ⊗ X ⊗ X ⊗ ← LINE 4
       X REPRESENTS LUMINANCE SAMPLES
       O REPRESENTS CHROMINANCE SAMPLES
``` fig. 6 fig. 7 fig. 8

DIGITAL VIDEO DECODE SYSTEM WITH OSD PROCESSOR FOR CONVERTING GRAPHICS DATA IN 4:4:4 FORMAT TO 4:2:2 FORMAT BY MATHEMATICALLY COMBINING CHROMINANCE VALUES

TECHNICAL FIELD

The present invention is directed generally to digital video signal processing, and more particularly, to an on-screen display (OSD) processor for converting an image in 4:4:4 format to 4:2:2 format by mathematically combining at least two adjacent picture element values to produce a new value and using the new value for each of the at least two adjacent picture elements.

BACKGROUND OF THE INVENTION

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. Video decoding in accordance with the MPEG-2 standard is described in detail in commonly assigned U.S. Pat. No. 5,576,765, entitled "Video Decoder", which is hereby incorporated herein by reference in its entirety.

MPEG-2 video decoder/display chips are typically designed with a secondary display processor used for creating an overlay on the display. The source for the overlay image is coded overlay data that resides in the same memory that holds the MPEG video reference frames, input buffer, and user data storage. This secondary video, known in the industry as the on-screen display (OSD), is often used by a digital video system to convey information to a viewer such as television program schedules, viewing guide information, recording lists, headline news, sporting results, operational details, etc. When a customer is not viewing a full screen video program, the customer is probably interfacing with one of the OSD functions listed above.

On-Screen Display (OSD) arrangements employed in video processing systems include a switching (or "multiplexing") network for switching between graphic image representative signals and normal video signals so that a graphic image can be displayed on the screen of a picture reproduction device either in place of the image represented by the video signals or togther with (inserted in) the image. The graphic image can take the form of alphanumeric symbols or pictorial graphics, and can be used to indicate status information, such as channel numbers or time, or operating instructions.

Besides program video and audio quality, the OSD functions play a major part in a viewer's perception of the overall quality of a digital video system. Thus, significant attention is given in the industry to the design and capabilities of the OSD features. This invention provides further enhancements to the conventional OSD processor and OSD features in order to establish commercial advantage of a digital video system employing the same.

DISCLOSURE OF THE INVENTION

This invention concerns a digital OSD arrangement for a digital video processing system, and especially one for digital video processing system in which the digital video signals represent image information in compressed form.

Briefly summarized, this invention comprises in one aspect a sub-system for a digital video decode system. The sub-system includes memory for receiving a graphics bitmap in 4:4:4 format. The graphics bitmap comprises a plurality of picture elements. The sub-system further includes an on-screen display processor coupled to the memory for converting the graphics bitmap in 4:4:4 format to graphics image words in 4:2:2 format. At least one graphics image word has a blended chrominance value obtained by merging chrominance values of at least two adjacent picture elements of the graphics bitmap. The blended chrominance value is obtained by mathematically combining corresponding chrominance values of the at least two picture elements merged to obtain the blended chrominance value.

In another aspect, a digital video signal processing system is provided which includes a video decoder for decoding a received sequence of encoded video data to form video image groups. Each video image group corresponds to two picture elements and includes a first luminance component corresponding to a first picture element of the two picture elements, a second luminance component corresponding to a second picture element of the two picture elements, and a pair of color difference components corresponding to each of the picture elements. The system further includes memory for storing on-screen display data comprising a graphics image. The on-screen display data is organized into graphics image groups. Each graphics image group corresponds to one picture element and includes a luminance component and two color difference components corresponding to the picture element.

An on-screen display processor is coupled to the memory for converting respective pairs of sequential graphics image groups stored in the memory to new graphics image groups. Each new graphics image group corresponds to two picture elements and includes a first luminance component corresponding to a first picture element of the two picture elements, a second luminance component corresponding to a second picture element of the two picture elements, and two blended color difference components corresponding to each of the picture elements. The two blended color difference components of each new graphics image group are produced by the on-screen display processor by respectively merging the two color difference components corresponding to the first picture element with the two color difference components corresponding to the second picture element comprising the pair of picture elements within the new graphics image group. The sub-system further includes a multiplexer which is responsive to the video image groups and to the new graphics image groups for selecting either the video image groups or the new graphics image groups to produce a sequence of resultant image groups. Each of the resultant image groups corresponds to two picture elements and includes a first luminance component corresponding to a first picture element of the two picture elements, a second luminance component corresponding to a second picture element of the two picture elements, and two blended color difference components corresponding to each of the two picture elements.

Processing methods and articles of manufacture encompassing the techniques of the above-outlined systems are also described and claimed herein.

To restate, an OSD processor is provided herein for a digital video decode system. This OSD processor has certain enhanced OSD capabilities. For example, an OSD processor in accordance with the principles of the present invention creates a more complex image without the need for using up colors in the limited space of an OSD color table (also known as CLUT). The resultant image has a "softer" look to it, without the hard edged colors created by the typical prior approach for converting from 4:4:4 to 4:2:2 format, i.e., by simply deleting every even or odd pixel's chrominance pair. The softer image has the effect of reducing aliasing and sharp steps on angled lines within the displayed image. Also, within the world of graphics, when a single pixel-wide vertical line is to be represented, conversion from 4:4:4 format to 4:2:2 format using the above-noted prior art approach could make the image disappear if the image resides in a column that coincides with the pixel column having the deleted extra pair of chrominance values. Advantageously, an OSD processor implemented in accordance with the principles of the present invention employs chrominance merging or averaging thereby allowing a single pixel-wide vertical line of graphics data to be displayed irrespective of which pixel column the line is drawn in.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

As the present invention may be applied in connection with an MPEG-2 decoder, in order to facilitate an understanding of the invention, some basic aspects of the MPEG-2 compression algorithm are first reviewed. It is to be noted, however, that the invention can also be applied to other video coding algorithms which share some of the features of the MPEG-2 algorithm.

To begin with, it will be understood that the compression of a data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or non-interlaced component video. Each picture has three components: luminance (Y), red color difference (Cr), and blue color difference (Cb). The video data may be coded in 4:4:4 format, in which case there is one Cr and one Cb sample for each Y sample, in 4:2:2 format, in which case there are half as many Cr and Cb samples as luminance samples in the horizontal direction, or in 4:2:0 format, in which case there are half as many Cr and Cb samples as luminance samples in both the horizontal and vertical directions.

Figure 1:
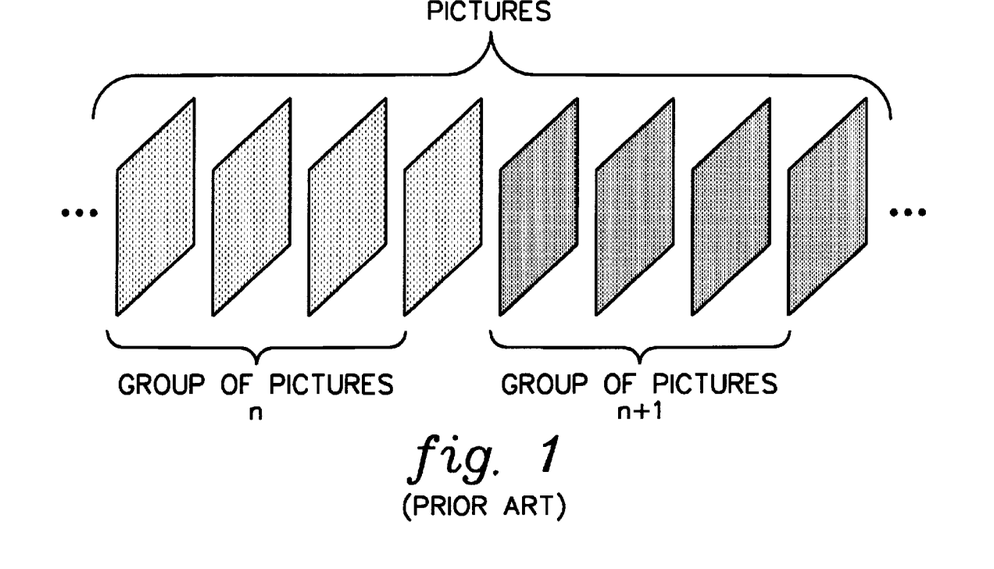
FIG. 1 shows an exemplary pair of groups of pictures (GOPs)
Figure 2:
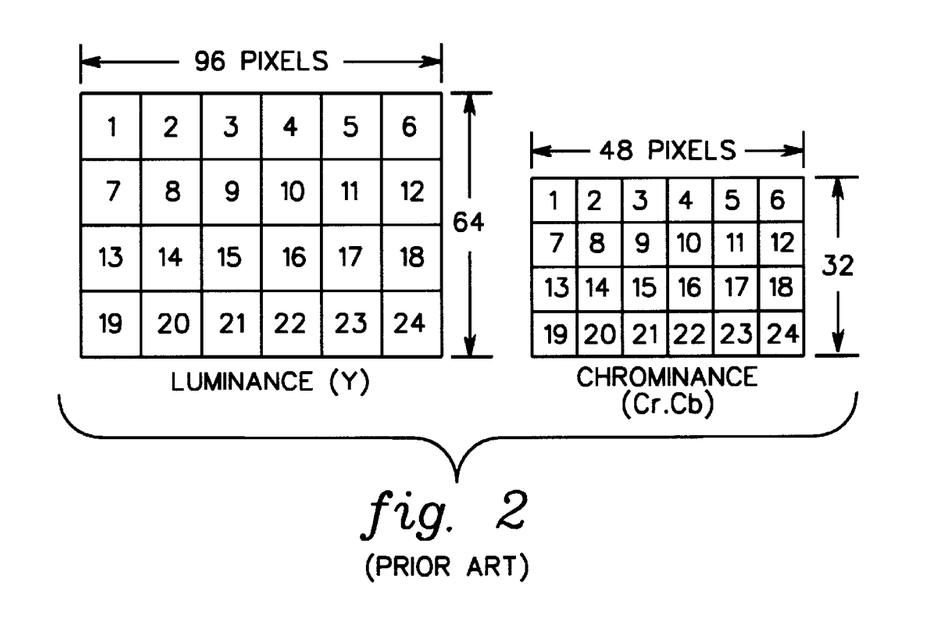
FIG. 2 shows an exemplary macroblock (MB) subdivision of a picture (4:2:0 format)

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1 & 2. The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOPs. There is no limit to the number of pictures which may be in a GOP, nor do there have to be equal numbers of pictures in all GOPs.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a field-structured picture contains information for C×R/2 pixels.

The two fields in a frame are the top field and the bottom field. If we number the lines in a frame starting from 1, then the top field contains the odd lines (1, 3, 5, . . . ) and the bottom field contains the even lines (2, 4, 6, . . . ). Thus we may also call the top field the odd field, and the bottom field the even field.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

With the MPEG-2 standard, a frame can be coded either as a frame-structured picture or as two field-structured pictures. If a frame is coded as two field-structured pictures, then both fields can be coded as I pictures, the first field can be coded as an I picture and the second field as a P picture, both fields can be coded as P pictures, or both fields can be coded as B pictures.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The second step, quantization of the DCT coefficients, is the primary source of lossiness in the MPEG-2 algorithm. Denoting the elements of the two-dimensional array of DCT coefficients by cmn, where m and n can range from 0 to 7, aside from truncation or rounding corrections, quantization is achieved by dividing each DCT coefficient cmn by wmn times QP, with wmn being a weighting factor and QP being the quantizer parameter. The weighting factor wmn allows coarser quantization to be applied to the less visually significant coefficients. The quantizer parameter QP is the primary means of trading off quality vs. bit-rate in MPEG-2.

It is important to note that QP can vary from MB to MB within a picture.

Following quantization, the DCT coefficient information for each MB is organized and coded, using a set of Huffman codes. As the details of this step are not essential to an understanding of the invention and are generally understood in the art, no further description is needed here.

Most video sequences exhibit a high degree of correlation between consecutive pictures. A useful method to remove this redundancy prior to coding a picture is "motion compensation". MPEG-2 provides tools for several methods of motion compensation.

The methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. If no motion compensation is used, the macroblock is intra (I). The encoder can make any macroblock intra. In a P or a B picture, forward (F) motion compensation can be used; in this case, the predictive macroblock is formed from data in the previous I or P frame. In a B picture, backward (B) motion compensation can also be used; in this case, the predictive macroblock is formed from data in the future I or P frame. In a B picture, forward/backward (FB) motion compensation can also be used; in this case, the predictive macroblock is formed from data in the previous I or P frame and the future I or P frame.

Because I and P pictures are used as references to reconstruct other pictures (B and P pictures) they are called reference pictures. Because two reference frames are needed to reconstruct B frames, MPEG-2 decoders typically store two decoded reference frames in memory.

Aside from the need to code side information relating to the MB mode used to code each MB and any motion vectors associated with that mode, the coding of motion-compensated macroblocks is very similar to that of intra-mode MBs. Although there is a small difference in the quantization, the model of division by wmn times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 3:
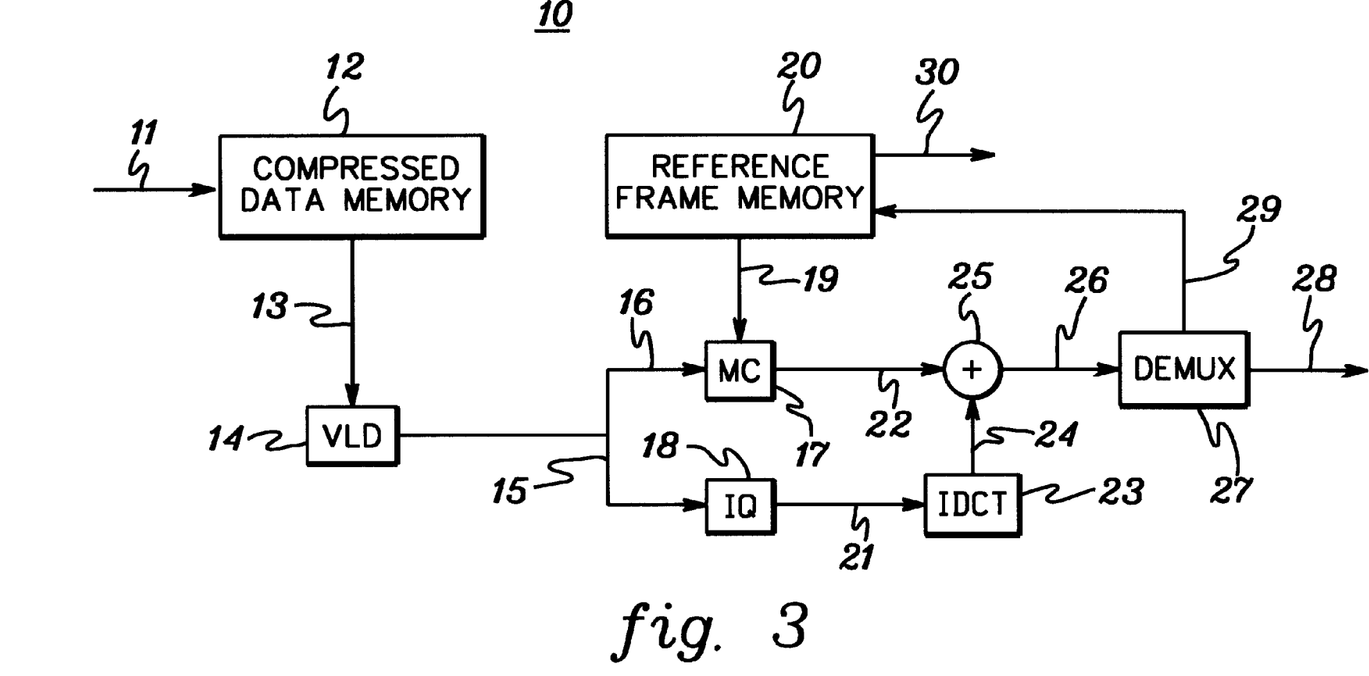
FIG. 3 depicts a block diagram of a video decoder.

FIG. 3 shows a diagram of a conventional video decoder. The compressed data enters as signal 11 and is stored in the compressed data memory 12. The variable length decoder (VLD) 14 reads the compressed data as signal 13 and sends motion compensation information as signal 16 to the motion compensation (MC) unit 17 and quantized coefficients as signal 15 to the inverse quantization (IQ) unit 18. The motion compensation unit reads the reference data from the reference frame memory 20 as signal 19 to form the predicted macroblock, which is sent as the signal 22 to the adder 25. The inverse quantization unit computes the unquantized coefficients, which are sent as signal 21 to the inverse transform (IDCT) unit 23. The inverse transform unit computes the reconstructed difference macroblock as the inverse transform of the unquantized coefficients. The reconstructed difference macroblock is sent as signal 24 to the adder 25, where it is added to the predicted macroblock. The adder 25 computes the reconstructed macroblock as the sum of the reconstructed difference macroblock and the predicted macroblock. The reconstructed macroblock is then sent as signal 26 to the demultiplexer 27, which stores the reconstructed macroblock as signal 29 to the reference memory if the macroblock comes from a reference picture or sends it out (to memory or display) as signal 28. Reference frames are sent out as signal 30 from the reference frame memory.

Figure 4:
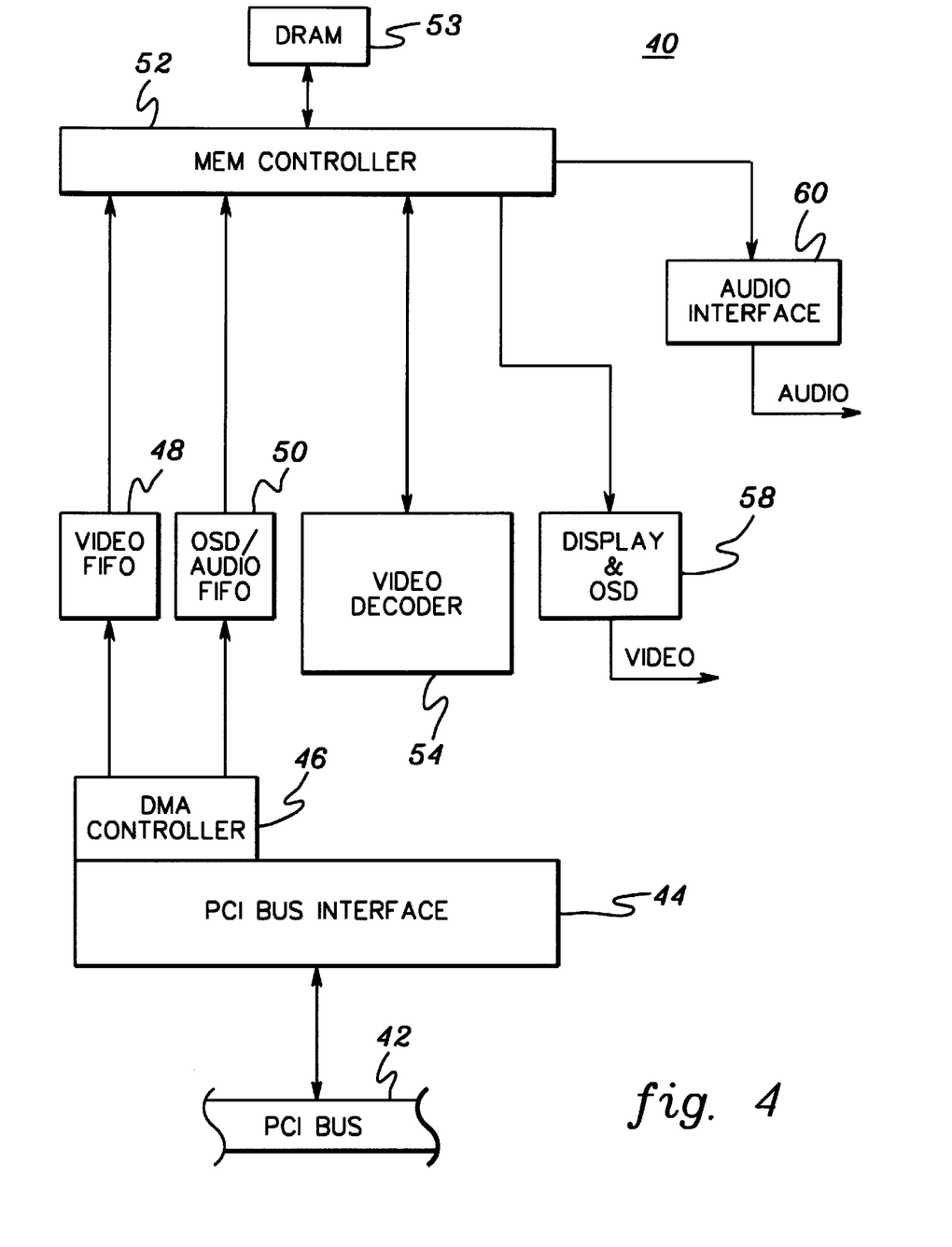
FIG. 4 is a block diagram of a video decoding system to employ the principles of the present invention.

A decode system, generally denoted 40, to employ the present invention is depicted in FIG. 4. System 40 might include a PCI bus interface 44 which couples the decode system 40 to a PCI bus 42. MPEG encoded video data is fetched from PCI bus 42 by a DMA controller 46 which writes the data to a video First-In/First-Out (FIFO) buffer 48. The DMA controller also fetches on-screen display and/or audio data from PCI bus 42 for writing to an OSD/audio FIFO 50. A memory controller 52 will place video data into a correct memory buffer within dynamic random access memory (DRAM) 53. As used herein, "DRAM" is intended to encompass synchronous dynamic random access memory as well. MPEG compressed video data is then retrieved by the video decoder 54 from DRAM 53 and decoded as described above in connection with FIG. 3. Conventionally, the decoded video data is then stored back into the frame buffers of DRAM 53 for subsequent use as already described. When a reference frame is needed, or when video data is to be output from the decode system, stored data in DRAM 53 is retrieved by the MEM controller and forwarded for output via a display & OSD interface 58. Audio data, also retrieved by the memory controller 52, is output through an audio interface 60.

More specifically, this invention relates to an enhanced OSD processor for the display & OSD unit of FIG. 4. An on-screen display system for an MPEG video decode system is disclosed that contains logical implementation to accommodate bitmap data alternately configured in color mapped and direct color formats. Overlay images to be displayed over MPEG video are stored in memory using one of these two different approaches: as "color mapped" image data or as "direct color" image data.

Because the overlay image resides in the same memory that holds MPEG video structures, small image size in memory is often desirable and the typical OSD design uses color mapped OSD data and processing of images. Color mapped storage of OSD images in memory is a reduced coding that allows use of only 2, 4, or sometimes 8 bits to describe both the luminance and chrominance of each pixel within an OSD region. As used herein, the phrase "color mapped OSD data" or "color mapped OSD region" thus refers to an overlay region described and processed using a color mapping approach within the OSD system. The bitmap bits are organized into displayable blocks (OSD regions) that contain both the bitmap color information and a control information header. The bitmap bits address a color lookup table with either preset color information, or alterable information as the screen progresses. These OSD regions are placed in memory as separately addressable packets, with the packets organized in display order fashion. The header control bits are responsible for functions such as:

Link address. The link address creates a link from one OSD region to another. The links between the OSD regions are set up in display order fashion. As the display progresses down the screen raster, a new OSD region may be linked into action by the previous OSD region.

Screen coordinates. Screen coordinates control the position of where the block of bitmapped pixels will appear on the display.

Color table. The color table assigns color values (Y, Cr and Cb) to specific patterns coded for each pixel in the bitmap. Usually one of the many combinations for Y, Cr and Cb is reserved with a special meaning. When the special Y, Cr and Cb pattern is selected from the color table by the bitmapped pixel, the "color" is understood to be transparent. A transparent "color" is one where the underlying video is allowed to show through the OSD overlay. Sometimes, a control is set in the OSD region header to regulate the ratio of video to OSD.

Blending control. This controls the mix ratio of the blending of an OSD image with the program video to give a "see-through" affect.

The main video format used for a set-top-box application, where the above-described OSD application will find its greatest use, is known in the industry as 4:2:0 format. Detailed information on 4:2:0 format can be obtained from the MPEG-2 Standard, ISO/IEC 13818-2. Briefly, when the original image is decoded, it may be sub-sampled in several ways in order to reduce the space that the image will require for storage, two of which include simple decimation, and another by means of a digital filter. This implies a certain spatial locality of the reduced luminance and chrominance samples with respect to the original samples. When this image is post-processed by the display function during the eventual expansion back to the original size, the spatial relationship must be reconstructed as closely as possible.

The chrominance difference signals are usually sub-sampled from the original image prior to MPEG-2 encoding. The chrominance sampling format is specified according to the following:

4:2:0 Chrominance difference signals are sub-sampled in one-half the resolution of the luminance in both the vertical dimension and horizontal dimension.

4:2:2 Chrominance difference samples are sub-sampled in one-half the resolution of the luminance in the horizontal dimension only.

4:4:4 There is an equal number of luminance samples and chrominance difference samples.

Figure 5:
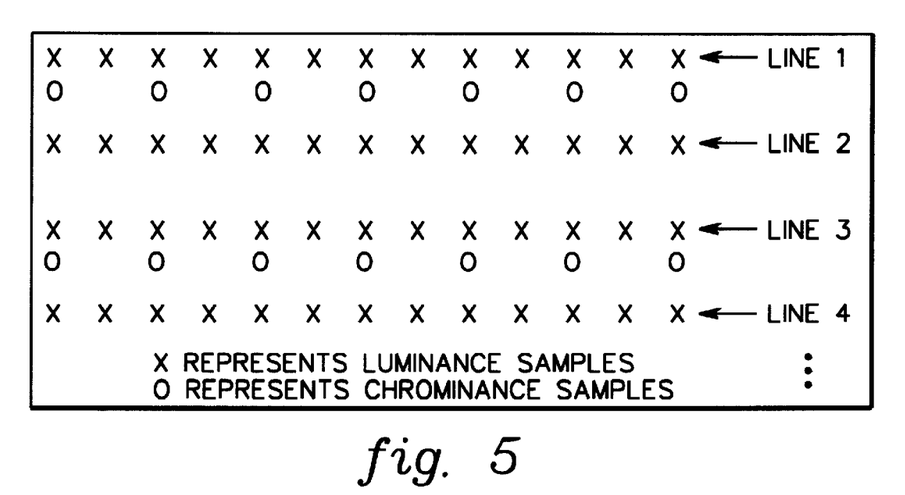
FIG. 5 shows the position of luminance and chrominance signals in 4:2:0 format.
Figure 6:
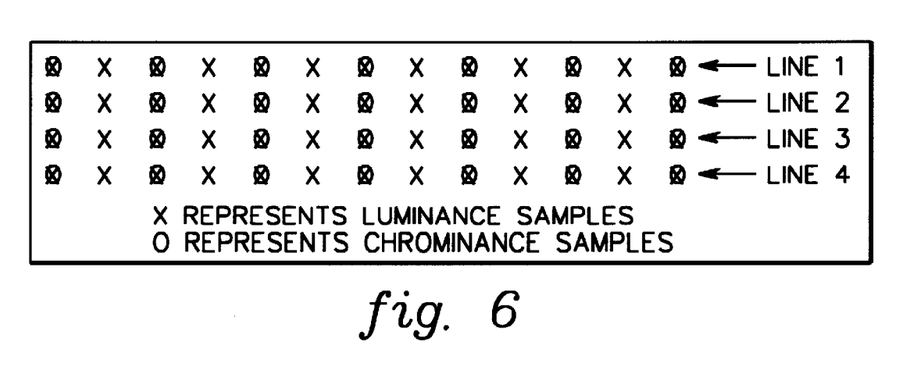
FIG. 6 shows the position of luminance and chrominance signals in 4:2:2 format.

For MPEG-2 main level, main profile, the compressed data consists of 4:2:0 chrominance. Most MPEG-2 decoders output the uncompressed video in 4:2:2 format. The 4:2:0 and 4:2:2 formats are represented in FIG. 5 and FIG. 6, respectively. As shown, the horizontal position of the chrominance samples is co-located with the luminance samples for MPEG-2 4:2:2 format. A co-located sample is made by taking the same number of samples of chrominance as luminance pixels, but then decimating every other sample.

Figure 7:
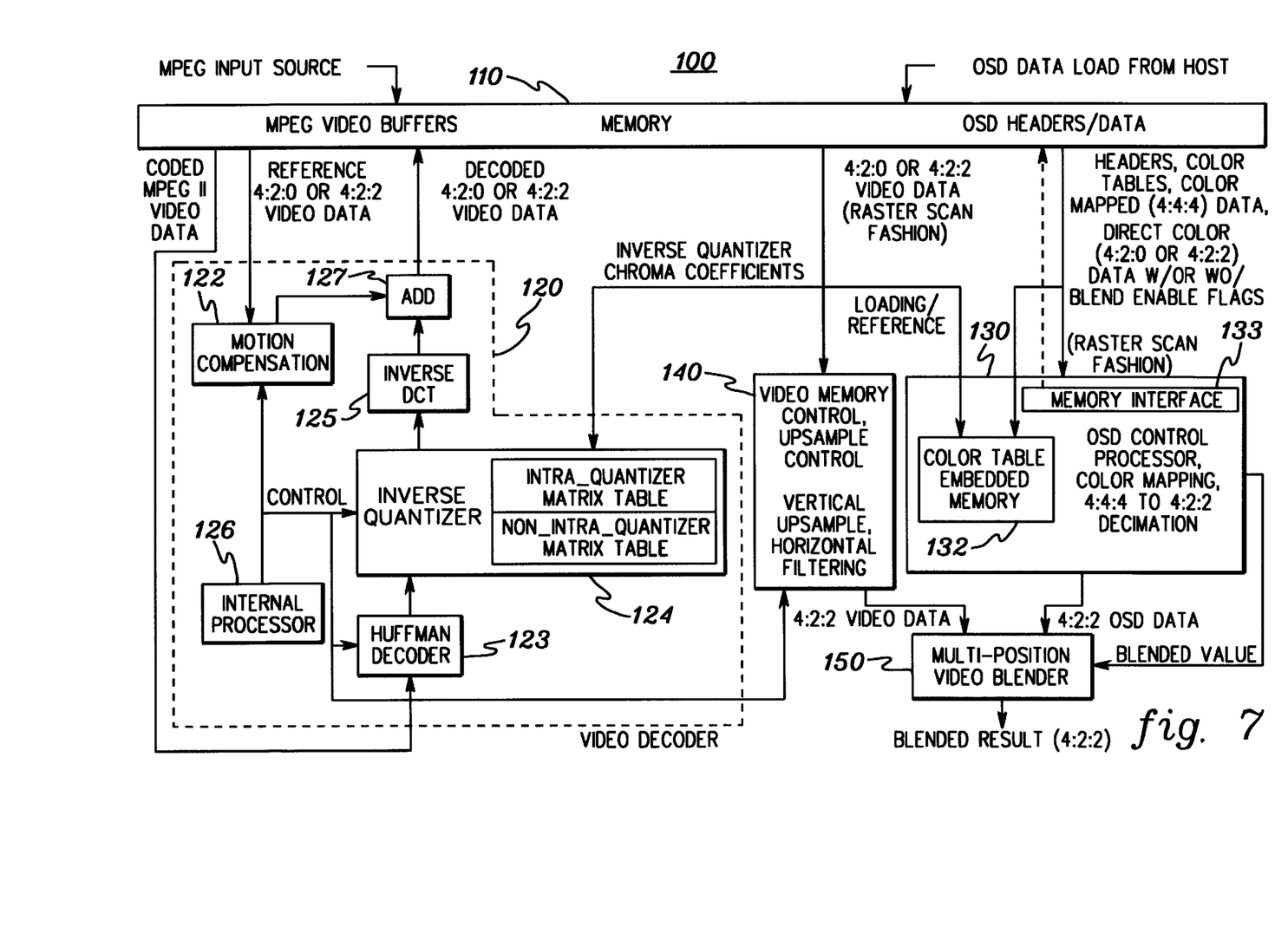
FIG. 7 depicts a more detailed embodiment of a digital video decode system in accordance with the principles of the present invention.

FIG. 7 presents one embodiment of a video decoder/OSD system in accordance with the principles of the present invention. This system 100 includes memory 110, such as SDRAM or DRAM, a video decoder 120, and an OSD control processor 130. In operation, encoded MPEG input is received into MPEG video buffers within memory 110. This video input can be in 4:2:0 or 4:2:2 video format. From the input, reference data is forwarded to a motion compensation unit 122 of video decoder 120 and coded MPEG-2 video data is forwarded to a Huffman decoder 123. Output from the variable length decoder 123 is forwarded to an inverse quantizer 124. The inverse quantizer computes the unquantized coefficients and forwards the coefficients to an inverse transform (IDCT) unit 125. An internal processor 126 coordinates the decode operation of motion compensation 122, Huffman decoder 123 and inverse quantizer 124. The inverse transformation unit computes the reconstructed difference macroblock as the inverse transform of the unquantized coefficients. The reconstructed difference macroblock is sent to an adder 127 where it is added to the predicted macroblock for motion compensation unit 122. The adder computes the reconstructed macroblock as the sum of the reconstructed difference macroblock and the predicted macroblock. The reconstructed macroblock is then sent to memory 110 as decoded 4:2:0 or 4:2:2 video data.

The decoded output written into memory 110 is retrieved in raster scan fashion by a video memory control/upsample control 140, which includes vertical upsample and horizontal filtering. Vertical upsample and horizontal filtering are described in detail in co-pending, commonly assigned U.S. patent application Ser. No. 09/015,463, entitled "Multi-Format Reduced Memory Video Decoder With Adjustable Polyphase Expansion Filter," the entirety of which is hereby incorporated herein by reference. Output from video memory control 140 is a 4:2:2 video data signal which is forwarded to a multi-position video blender 150 to produce a blended result of 4:2:2 video data. During this processing, any video data in 4:2:0 format is converted to 4:2:2 video data format, i.e., chrominance data is upsampled to match a 4:2:2 result.

Memory 110 also accommodates OSD headers/data loaded from a host processor. The host processor can comprise any source closer to the end user of the digital video system. Commensurate with retrieval of the decoded data in raster scan fashion, OSD control processor 130 is retrieving OSD data from memory. This OSD data comprises headers, color tables, color mapped (4:4:4) data, direct color (4:2:0 or 4:2:2) data, also in raster scan fashion. This data is passed through a memory interface 133 for processing by the OSD control processor. One embodiment of an OSD control processor is described in detail in co-pending, commonly assigned U.S. patent application Ser. No. 09/094,753, entitled "Color Mapped and Direct Color OSD Region Processor With Support For 4:2:2 Profile Decode Function," the entirety of which is hereby incorporated herein by reference. This application describes an OSD processor having a color mapped mode, direct color mode and 4:2:2 profile mode implemented using a common embedded memory within the processor.

Output from OSD control processor 130 comprises 4:2:2 OSD data, which is also forwarded to multi-position video blender 150. As noted, logic 150 produces the blended result in 4:2:2 format. Blend enable flags, comprising tags embedded within the OSD data stored into memory by the host processor, are forwarded by the OSD control processor to blender 150 as blend values. These blend values are used to control the final mixing stage of the video and OSD material.

Turning more particularly to the present invention, described herein below is an enhanced digital on-screen display (OSD) arrangement for a digital video decode processing system, and in particular, for a digital video processing system in which the digital video signals are in compressed form as described above. As noted above, the video image components of the digital video processing system generate a video image display in which for every two pixels there are two respective luminance representative words and one pair of color difference representative words in the so-called 4:2:2 format.

On the other hand, graphics components represent graphics image information in an uncompressed form in which for every one pixel there is one luminance representative word and one pair of color difference representative words (or for every two pixels there are two respective luminance representative words and two respective pairs of color difference words). The latter uncompressed form is known as the 4:4:4 format in the digital video signal processing field. The 4:4:4 graphics image sequence is desirable since it allows as many colors as possible to be defined with a given number of bits because it provides for a unique luminance component and two unique color difference components (U&V) for every pixel of graphics. However, the 4:4:4 graphics image sequence is not compatible with the 4:2:2 video image sequence and cannot be readily multiplexed with it so as to insert a graphic image into a video image.

To solve this problem, prior video decode systems include an OSD converter for converting the 4:4:4 sequence used for graphic image components to the 4:2:2 sequence used for the video image components. In one embodiment, the OSD converter could comprise a latch for storing two groups of graphic image components representative words, and a multiplexor which selects the appropriate component representative words in sequence from those stored in the latch at the output rate. It is conventionally desirable that the number of 4:4:4 groups of graphic image representative components per line be an even number because two of the original 4:4:4 graphic image groups are used to produce each new one of the 4:2:2 graphics image groups.

Conversion of OSD bitmap data from 4:4:4 to 4:2:2 format is conventionally accomplished by repeating the color difference components of one pixel of graphics in an adjacent pixel of graphics, thereby deleting the original color difference components of the adjacent pixel of graphics. Thus, for every even and odd pair of pixels of graphics, for example, the chrominance U and chrominance V values of the even pixel in the even odd pixel pair may be repeated, i.e., employed for both the even pixel and odd pixel in the pair. The problem with this "decimation" process is that by decimating every other pixel chrominance pair, significant information could be lost in the resultant display. For example, if the graphics image includes a vertical line that is one pixel wide and which occurs within the column of pixels having chrominance pairs decimated, the line will be lost in the resultant display. The goal of the present invention is to address this problem.

Figure 8:
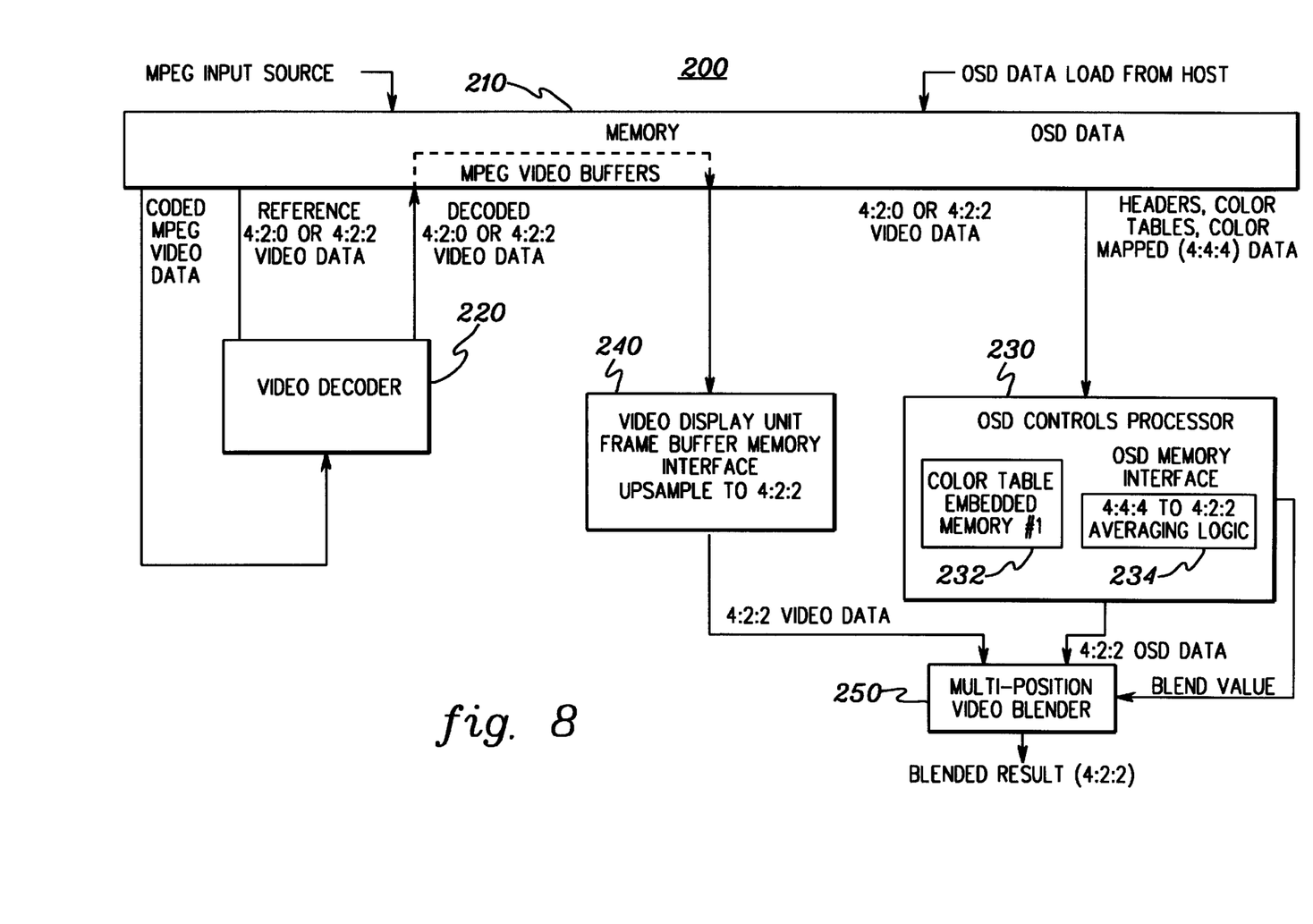
FIG. 8 depicts a digital video decode system such as shown in FIG. 7, wherein the memory and on-screen display processor sub-system of the present invention are shown in greater detail.

FIG. 8 depicts one embodiment of a digital video decode system, generally denoted 200, in accordance with the principles of the present invention. Decode system 200 is similar to the decode systems described above. In particular, in this embodiment, MPEG data is received from an elementary video source into a memory 210 for retrieval by a video decoder 220. Decoder 220 decodes the video data into 4:2:0 or 4:2:2 video format. During this decoding process, decoder 220 may employ reference video data in 4:2:0 or 4:2:2 format. Memory 210 includes MPEG video buffers or frame buffers from which microprocessor control (not shown) retrieves the video data in 4:2:0 or 4:2:2 format for forwarding to a video display unit 240. Unit 240 includes frame buffer memory interface logic as well as up sample logic to 4:2:2 format. Output from unit 240 are I, B & P pictures in 4:2:2 format. This 4:2:2 video data is provided as input to a multi-position video blender 250 for outputting of a blended result in 4:2:2 format as described above. The other input to blender 250 is OSD data in 4:2:2 format.

FIG. 8 also depicts one embodiment of an OSD arrangement in accordance with the principles of the present invention. In this arrangement, OSD data is loaded from a host, such as a set top box processor, into memory 210. A memory controller (not shown) retrieves the OSD data, shown to comprise OSD control information, color tables, and OSD color mapped 4:4:4 data, for forwarding to an OSD control processor 230. The OSD control processor includes OSD memory interface logic, as well as an embedded memory for receiving the color tables 232. In accordance with the principles of the present invention, processor 230 also includes 4:4:4 to 4:2:2 averaging logic 234. This averaging logic comprises one embodiment of the present technique for converting OSD data from 4:4:4 format to 4:2:2 format for output to blender 250. As shown, processor 230 also outputs a blend value to blender 250 for controlling the blended result in 4:2:2 format, as described above.

In accordance with the principles of the present invention, logic 234 comprises an image converter which converts the graphics bitmap in 4:4:4 format to graphics image words in 4:2:2 format. As one example, each graphics image word could comprise two pixels or picture elements. The two picture elements include two luminance values and one set of chrominance values, i.e., one U chrominance and V chrominance pair. This one U chrominance and V chrominance pair is referred to herein as a blended chrominance value or pair. In accordance with the invention, this blended chrominance value is obtained by mathematically combining the U, V chrominance set of each picture element of the at least two picture elements comprising each graphics image word. This mathematical combining could result in blended chrominance values of βU and βV where β is a fraction obtained pursuant to a predefined ratio of the first picture element's U chrominance to the second picture element's U chrominance, as well as a predefined ratio of the first picture element's V chrominance to the second picture element's V chrominance. In one example, β=0.5 which is obtained by simple averaging of the chrominance values for two picture elements comprising a graphics image word. Table 1 below depicts the resultant graphics image groups obtained in accordance with this embodiment of the present invention.

TABLE 1

| Data Structure | Even Pixel | Odd Pixel | Even Pixel | Odd Pixel . . . |
|---|---|---|---|---|
| OSD Bitmap (4:4:4) | Y0 | Y1 | Y2 | Y3 |
|  | U0 | U1 | U2 | U3 |
|  | V0 | V1 | V2 | V3 |
| OSD Output Pixel (4:2:2) | Y0 | Y1 | Y2 | Y3 |
|  | U0.5 | U0.5 | U2.5 | U2.5 |
|  | V0.5 | V0.5 | V2.5 | V2.5 |

Where: U0.5=(U0+U1)/2
V0.5=(V0+V1)/2
U2.5=(U2+U3)/2
V2.5=(V2+V3)/2

Again, those skilled in the art will note that averaging of the even and odd pixel pairs in each graphics image group is presented herein by way of example only. The concept is to mathematically combine the U chrominance values of each pixel in the group and to mathematically combine the V chrominance values of each pixel in the group. Thus, the result will show a difference in the resultant data when, for example, a vertical line occurs in the graphics data in only an even pixel column or an odd pixel column. Further, those skilled in the art should note that each graphics image group could comprise more than two pixels if desired.

To summarize, presented herein is an OSD arrangement for a digital video signal processing system, and especially one for a digital video processing system in which the digital video signals are in compressed form. The digital video processing system receives encoded packets of data representing image information in compressed form. A video decoder and associated video memory are used to decode and decompress the video packets to form groups of video image representative digital words. Especially pertaining to this information, the video decoder contains an on-screen display processor, which converts a graphics bit map stored in video memory in the form of 4:4:4 format to groups of graphics image representative digital words. The conversion of the graphics image representative digital words is such that the resultant words are each made up of two luminance components and a color difference component (chrominance), and such that the conversion results in the graphics image words be in the form of 4:2:2 format. Specifically, the conversion is such that the chrominance components that make up two or more adjacent pixel elements in each graphics image words in original 4:4:4 format are combined mathematically, for example, via averaging, to form a new chrominance UV pair which corresponds to the at least two picture elements comprising the graphics image word.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A sub-system for a digital video system, said sub-system comprising:
    memory for receiving a graphics bitmap in 4:4:4 format, said graphics bitmap comprising a plurality of picture elements; and
    an on-screen display processor coupled to said memory for converting said graphics bitmap in 4:4:4 format to graphics image words in 4:2:2 format, wherein at least one graphics image word has a blended chrominance value obtained by merging chrominance values of at least two adjacent picture elements of said graphics bitmap, said blended chrominance value being obtained by mathematically combining corresponding chrominance values of said at least two picture elements merged to obtain said blended chrominance value, wherein said mathematically combining comprises logic for averaging said chrominance values of said at least two picture elements to obtain said blended chrominance value, said logic for averaging comprising logic for averaging U chrominances of said at least two picture elements to obtain a blended U chrominance, and for averaging V chrominances of the at least two picture elements to obtain a blended V chrominance.

2. The sub-system of claim 1, wherein said mathematical combining results in said blended chrominance value being other than one of said corresponding chrominance values of said at least two adjacent picture elements merged to obtain said blended chrominance value.

3. A digital video signal processing system comprising:
a video decoder for decoding a received sequence of encoded video data to form video image groups, each video image group corresponding to two picture elements and including a first luminance component corresponding to a first picture element of said two picture elements, a second luminance component corresponding to a second picture element of said two picture elements, and a pair of color difference components corresponding to each of said picture elements;
a memory for storing on-screen display data comprising a graphics image, said on-screen display data being organized into graphics image groups, each graphics image group corresponding to one picture element and including a luminance component and two color difference components corresponding to said picture element;
an on-screen display processor coupled to said memory for converting respective pairs of sequential graphics image groups stored in said memory to new graphics image groups, each new graphics image group corresponding to two picture elements and including a first luminance component corresponding to a first picture element of said two picture elements, a second luminance component corresponding to a second picture element of said two picture elements, and two blended color difference components corresponding to each of said picture elements, said two blended color difference components of each said new graphics image group being produced by said on-screen display processor by respectively merging said two color difference components corresponding to a first picture element with said two color difference components corresponding to a second picture element comprising said pair of picture elements within said new graphics image group; and
a multiplexer responsive to said video image groups and to said new graphics image groups for selecting either said video image groups or said new graphics image groups to produce a sequence of resultant image groups, each of said resultant image groups corresponding to two picture elements and including a first luminance component corresponding to a first picture element of said two picture elements, a second luminance component corresponding to a second picture element of said two picture elements, and two blended color difference components corresponding to each of said two picture elements.

4. The digital video signal processing system of claim 3, wherein said on-screen display processor further comprises means for mathematically averaging said two color difference components corresponding to said first picture element with said two color difference components corresponding to said second picture element comprising said pair of picture elements of said new graphics image group.

5. The digital video signal processing system of claim 4, wherein said two blended color difference components of each said new graphics image group comprise a blended U chrominance and blended V chrominance pair.

6. A method for processing on-screen display (OSD) data within a digital video system, said method comprising:
receiving in memory a graphics bitmap in 4:4:4 format, said graphics bitmap comprising a plurality of picture elements;
converting said graphics bitmap in 4:4:4 format to graphics image words in 4:2:2 format employing an OSD display processor, wherein at least one graphics image word has a blended chrominance value obtained by merging chrominance values of at least two adjacent picture elements of said graphics bitmap, said blended chrominance value being obtained by mathematically combining corresponding chrominance values of said at least two adjacent picture elements merged to obtain said blended chrominance value, wherein said mathematically combining comprises averaging said chrominance values of said at least two adjacent picture elements to obtain said blended chrominance value, said averaging comprising averaging U chrominances of said at least two picture elements to obtain a blended U chrominance, and for averaging V chrominances of the at least two picture elements to obtain a blended V chrominance.

7. The method of claim 6, wherein said mathematical combining results in said blended chrominance value being other than one of said corresponding chrominance values of said at least two adjacent pixel elements merged to obtain said blended chrominance value.

8. At least one program storage device readable by a machine, tangibly embodying at least one program of instructions executable by the machine to perform a method for processing on-screen display (OSD) data within a digital video system, said method comprising:
receiving in memory a graphics bitmap in 4:4:4 format, said graphics bitmap comprising a plurality of picture elements;
converting said graphics bitmap in 4:4:4 format to graphics image words in 4:2:2 format employing an OSD display processor, wherein at least one graphics image word has a blended chrominance value obtained by merging chrominance values of at least two adjacent picture elements of said graphics bitmap, said blended chrominance value being obtained by mathematically combining corresponding chrominance values of said at least two adjacent picture elements merged to obtain said blended chrominance value, wherein said mathematically combining comprises averaging said chrominance values of said at least two adjacent picture elements to obtain said blended chrominance value, said averaging comprising averaging U chrominances of said at least two picture elements to obtain a blended U chrominance, and for averaging V chrominances of the at least two picture elements to obtain a blended V chrominance.

9. The at least one program storage device of claim 8, wherein said mathematical combining results in said blended chrominance value being other than one of said corresponding chrominance values of said at least two adjacent pixel elements merged to obtain said blended chrominance value.

* * * * *